US012759648B2

(12) United States Patent
Prior et al.

(10) Patent No.: US 12,759,648 B2
(45) Date of Patent: Oct. 13, 2026

(54) VEHICLE TAILGATE LATCH SYSTEM

(71) Applicant: Ford Global Technologies, LLC, Dearborn, MI (US)

(72) Inventors: Joseph Prior, Detroit, MI (US); Joshua Robert Hemphill, White Lake, MI (US); Michael Shawn Watterworth, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 18/972,049

(22) Filed: Dec. 6, 2024

(65) Prior Publication Data

US 2026/0159180 A1 Jun. 11, 2026

(51) Int. Cl.
*B62D 33/037* (2006.01)
*E05B 15/02* (2006.01)
*E05B 83/18* (2014.01)

(52) U.S. Cl.
CPC .......... *B62D 33/037* (2013.01); *E05B 15/024* (2013.01); *E05B 83/18* (2013.01); *E05B 2015/027* (2013.01); *E05Y 2900/516* (2013.01); *E05Y 2900/544* (2013.01)

(58) Field of Classification Search
CPC . B62D 33/037; B62D 33/0273; E05B 15/024; E05B 2015/027; E05B 83/18
See application file for complete search history.

(56) References Cited

U.S. PATENT DOCUMENTS

| | | | | |
|---|---|---|---|---|
| 3,454,299 A | 7/1969 | Hewitt et al. | | |
| 3,567,274 A | 3/1971 | Kaptur, Jr. et al. | | |
| 4,157,844 A | 6/1979 | Sarosy et al. | | |
| 5,531,498 A | 7/1996 | Kowall | | |
| 7,165,800 B2 * | 1/2007 | Thiele | B60P 1/26 | 296/57.1 |
| 7,481,479 B1 * | 1/2009 | Townson | B62D 33/0273 | 296/146.12 |
| 7,597,374 B1 * | 10/2009 | Townson | B62D 33/0273 | 296/51 |
| 8,231,152 B2 | 7/2012 | Carlson | | |
| 10,358,172 B2 * | 7/2019 | Morley | B62D 33/0273 | |
| 2006/0001288 A1 | 1/2006 | Thiele et al. | | |
| 2009/0250961 A1 | 10/2009 | Townson | | |
| 2014/0338167 A1 | 11/2014 | Jackson, Jr. | | |
| 2015/0323032 A1 | 11/2015 | Gruber et al. | | |

(Continued)

*Primary Examiner* — Huan Le
(74) *Attorney, Agent, or Firm* — Vichit Chea; Carlson, Gaskey & Olds, P.C.

(57) ABSTRACT

A vehicle assembly includes a frame subassembly of a tailgate. The frame subassembly has a cargo bed access opening. The vehicle assembly further includes a door subassembly of the tailgate. The door subassembly is pivotably coupled to the frame subassembly. The door subassembly is pivotable relative to the frame subassembly back-and-forth between a door open position and a door closed position. The door subassembly in the door closed position closes the cargo bed access opening. A latch system holds the door subassembly in the door closed position. The latch system has a striker bracket that includes a striker post and a bumper flange configured to move together when the striker bracket is adjusted. At least one bumper compressed against the bumper flange when the door subassembly is in the door closed position.

19 Claims, 6 Drawing Sheets

(56) References Cited

U.S. PATENT DOCUMENTS

| | | | |
|---|---|---|---|
| 2019/0277068 | A1 | 9/2019 | Nelsen et al. |
| 2019/0360561 | A1 | 11/2019 | Castelblanco et al. |
| 2023/0322076 | A1 | 10/2023 | Frank et al. |
| 2023/0339541 | A1 | 10/2023 | Nysse et al. |
| 2024/0229521 | A1 | 7/2024 | Welch |

* cited by examiner

VEHICLE TAILGATE LATCH SYSTEM

TECHNICAL FIELD

This disclosure relates generally to a tailgate of a vehicle and, more particularly, to a latch system that holds a door subassembly of the tailgate in a closed position while constraining lateral movements of the door subassembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable to an open position to provide access to the cargo bed.

SUMMARY

In some aspects, the techniques described herein relate to a vehicle assembly, including: a frame subassembly of a tailgate, the frame subassembly having a cargo bed access opening; a door subassembly of the tailgate, the door subassembly pivotably coupled to the frame subassembly, the door subassembly pivotable relative to the frame subassembly back-and-forth between a door open position and a door closed position, the door subassembly in the door closed position closing the cargo bed access opening; a latch system that holds the door subassembly in the door closed position, the latch system having a striker bracket that includes a striker post and a bumper flange configured to move together when the striker bracket is adjusted; and at least one bumper compressed against the bumper flange when the door subassembly is in the door closed position.

In some aspects, the techniques described herein relate to a vehicle assembly, wherein the frame subassembly includes a first outboard section is on a driver side of the cargo bed access opening of the cargo bed access opening, and a second outboard section on a passenger side of the cargo bed access opening.

In some aspects, the techniques described herein relate to a vehicle assembly, wherein the striker bracket includes a base, the striker post and the bumper flange extending transversely from the base into the cargo bed access opening.

In some aspects, the techniques described herein relate to a vehicle assembly, wherein the striker bracket is mounted to the frame subassembly.

In some aspects, the techniques described herein relate to a vehicle assembly, wherein the striker bracket is adjustably mounted to the frame subassembly.

In some aspects, the techniques described herein relate to a vehicle assembly, wherein the at least one bumper is mounted to the bumper flange.

In some aspects, the techniques described herein relate to a vehicle assembly, wherein the striker bracket includes an inboard disk and an outboard disk spaced a distance from the inboard disk, and further including an anchor bracket having at least one tooth that projects into an area between the inboard disk and the outboard disk when the door subassembly is in the door closed position, the at least one tooth configured to contact the inboard disk to limit movement of the door subassembly away from the frame subassembly, the at least one tooth configured to contact the outboard disk to limit movement of the door subassembly toward the frame subassembly.

In some aspects, the techniques described herein relate to a vehicle assembly, wherein the striker bracket includes an anchor post having the inboard disk and the outboard disk.

In some aspects, the techniques described herein relate to a vehicle assembly, wherein the striker bracket is secured to the frame subassembly and the anchor bracket is secured to the door subassembly.

In some aspects, the techniques described herein relate to a vehicle assembly, wherein the anchor post is disposed between the bumper flange and the striker post.

In some aspects, the techniques described herein relate to a vehicle assembly, wherein the striker post is forward the anchor post.

In some aspects, the techniques described herein relate to a vehicle assembly, wherein the at least one tooth includes an upper tooth and a lower tooth.

In some aspects, the techniques described herein relate to a vehicle assembly, wherein the door subassembly and the frame subassembly are pivotable together about a first axis between a tailgate closed position and a tailgate open position, wherein the door subassembly is pivotable relative to the frame subassembly about a second axis between the door closed position and the door open position, the first axis transverse to the second axis.

In some aspects, the techniques described herein relate to a vehicle assembly, wherein the frame subassembly and the door subassembly are pivotable together about a horizontally extending axis, wherein the door subassembly is configured to pivot relative to the frame subassembly about a vertically extending axis.

In some aspects, the techniques described herein relate to a vehicle assembly, wherein the cargo bed access opening extends vertically downward at least as far as a floor of a cargo bed.

In some aspects, the techniques described herein relate to a tailgate assembly, including: a frame subassembly having a cargo bed access opening; a door subassembly pivotably coupled to the frame subassembly, the door subassembly and the frame subassembly pivotable together about a horizontally extending axis between a tailgate closed position and a tailgate open position, the door subassembly pivotable relative to the frame subassembly about a vertically extending axis between a door open position and a door closed position, the door subassembly in the door closed position closing the cargo bed access opening; and a latch system that holds the door subassembly in the door closed position, the latch system having a striker bracket mounted to the frame subassembly and an anchor bracket mounted to the door subassembly, the striker bracket including a striker post and an anchor post having an inboard disk and an outboard disk, the anchor bracket including having at least one tooth that is sandwiched between the inboard disk and the outboard disk when the door subassembly is in the door closed position.

In some aspects, the techniques described herein relate to a tailgate assembly, further including a base and a bumper flange of the striker bracket, wherein the bumper flange, the striker post, and the anchor post extend transversely from the base into the cargo bed access opening, wherein the base is secured directly to the frame subassembly.

In some aspects, the techniques described herein relate to a tailgate assembly, further including at least one bumper sandwiched between the bumper flange and the anchor bracket when the door subassembly is in the door closed position.

In some aspects, the techniques described herein relate to a tailgate assembly, wherein the at least one bumper is mounted to the bumper flange.

BRIEF DESCRIPTION OF THE DRAWINGS

The various features and advantages of this disclosure will become apparent to those skilled in the art from the following detailed description. The drawings that accompany the detailed description can be briefly described as follows.

DETAILED DESCRIPTION

Figure 1:
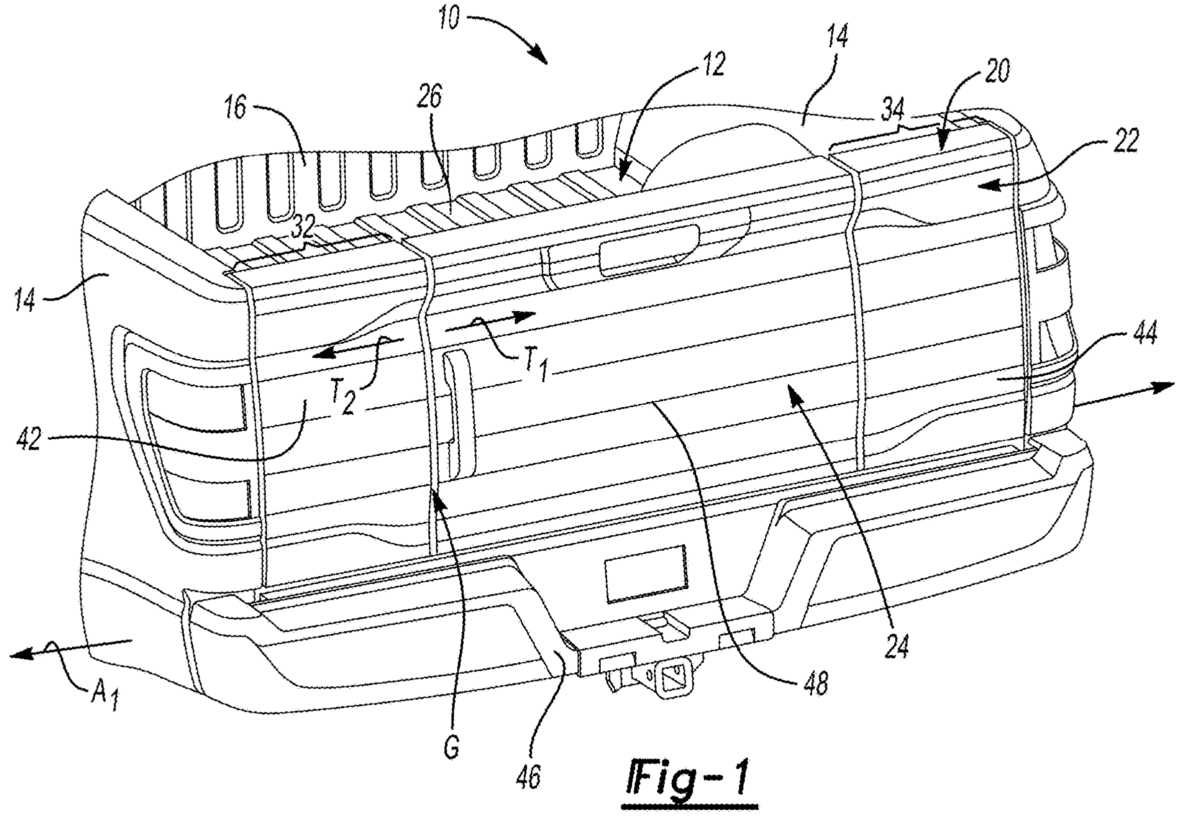
FIG. 1 is a rear perspective view of a motor vehicle equipped with a cargo space and having a tailgate assembly in a tailgate closed position relative to the cargo space.
Figure 2:
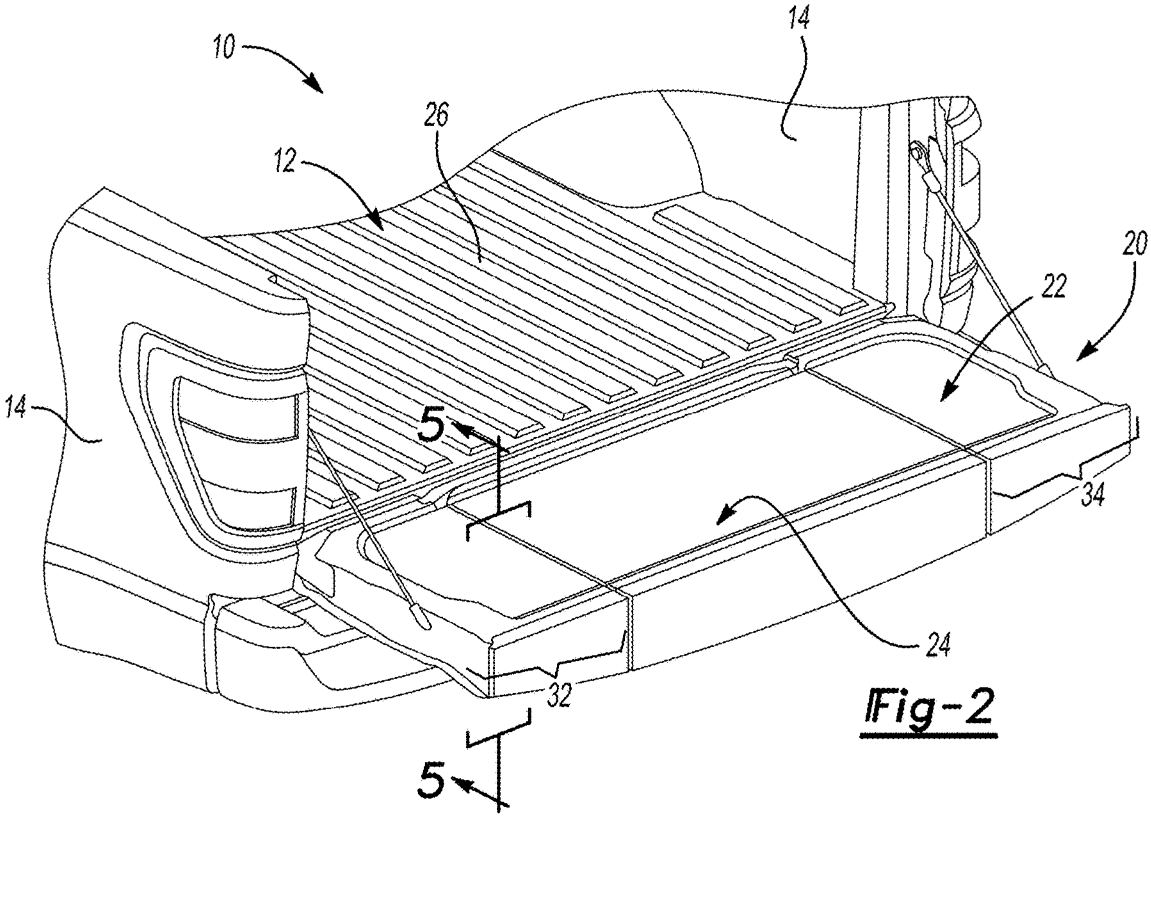
FIG. 2 illustrates the motor vehicle of FIG. 1 with the tailgate assembly in a tailgate open position.
Figure 3:
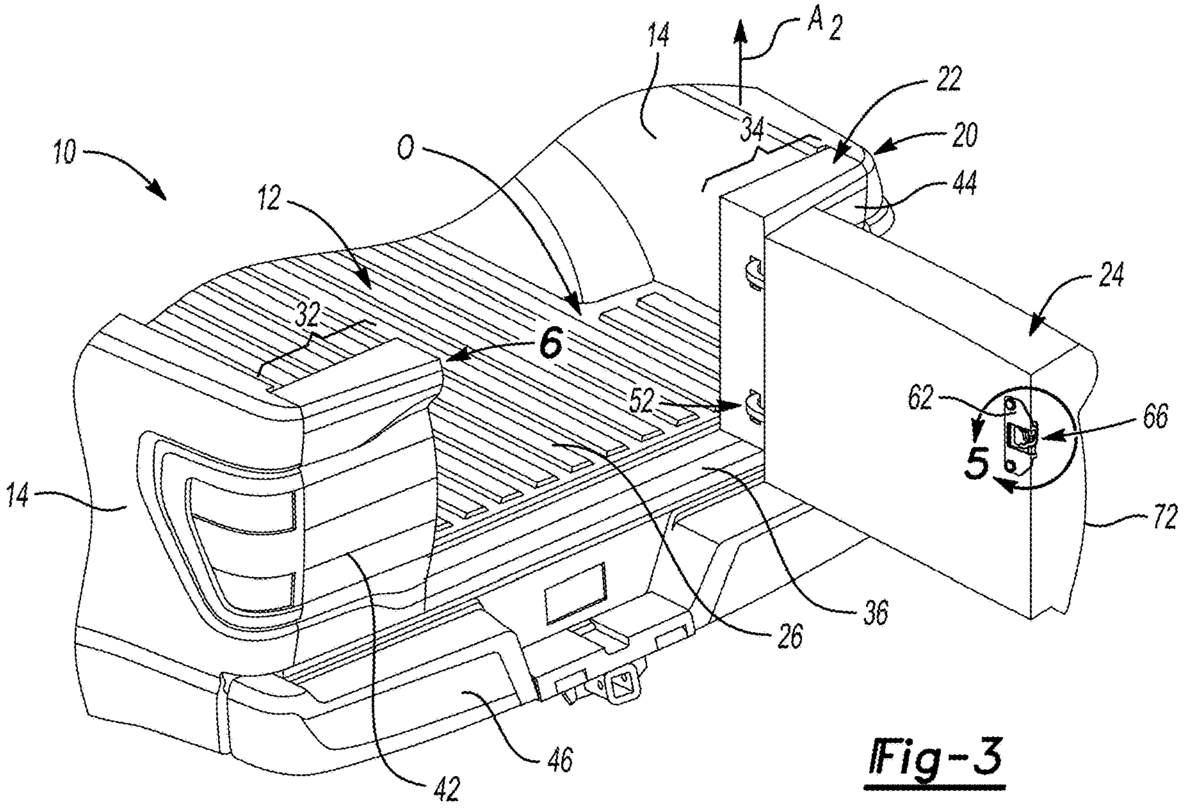
FIG. 3 illustrates the motor vehicle of FIG. 1 with a door subassembly of the tailgate assembly in a door open position relative to a frame subassembly of the tailgate assembly.

This disclosure details a tailgate assembly having a latch system used to secure a frame subassembly and a door subassembly. The door subassembly can be opened to provide an opening that, among other things, helps a user to access cargo within a cargo bed. The latch system can be used to secure the door assembly in a door closed position relative to the frame subassembly. The latch system maintains alignment of the door subassembly relative to the frame subassembly.

With reference to FIGS. 1-4, a vehicle 10, according to an exemplary aspect of the present disclosure, is a pickup truck. The vehicle 10 has a cargo bed 12 that is provided by a pair of sidewalls 14, a front wall 16, and a tailgate assembly 20. The cargo bed 12 can hold various types of cargo, including material, such as mulch, rocks, dirt, etc.

The tailgate assembly 20 includes, among other things, a frame subassembly 22 and a door subassembly 24. The tailgate assembly 20 is pivotable about a first axis $A_1$ relative to the cargo bed 12 between a tailgate closed position shown in FIG. 1 and a tailgate open position shown in FIG. 2. The example tailgate assembly 20 is vertically aligned when in the tailgate closed position and horizontally aligned when in the tailgate open position. Vertical and horizontal, for purposes of this disclosure, are with reference to ground and an ordinary orientation of the vehicle 10 during operation.

The door subassembly 24 is in a door closed position and is latched to the frame subassembly 22 when the frame subassembly 22 and the door subassembly 24 are pivoted between the tailgate closed position and the tailgate open position. Thus, the frame subassembly 22 and the door subassembly 24 pivot together when the tailgate assembly 20 is pivoted between the tailgate closed position and the tailgate open position.

When the tailgate assembly 20 is in the tailgate closed position, the door subassembly 24 is pivotable relative to the frame subassembly 22 about a second axis $A_2$. The door subassembly 24 can pivot back-and-forth between a door closed position shown in FIG. 1 and a door open position shown in FIGS. 3 and 4. The first axis $A_1$ is a horizontally extending axis in this example. The second axis $A_2$ is transverse to the first axis $A_1$ and is a vertically extending axis in this example.

The door subassembly 24 in the door open position provides a cargo bed access opening O. In this example, the cargo bed access opening O extends vertically downward at least as far as a floor 26 of the cargo bed 12.

Figure 4:
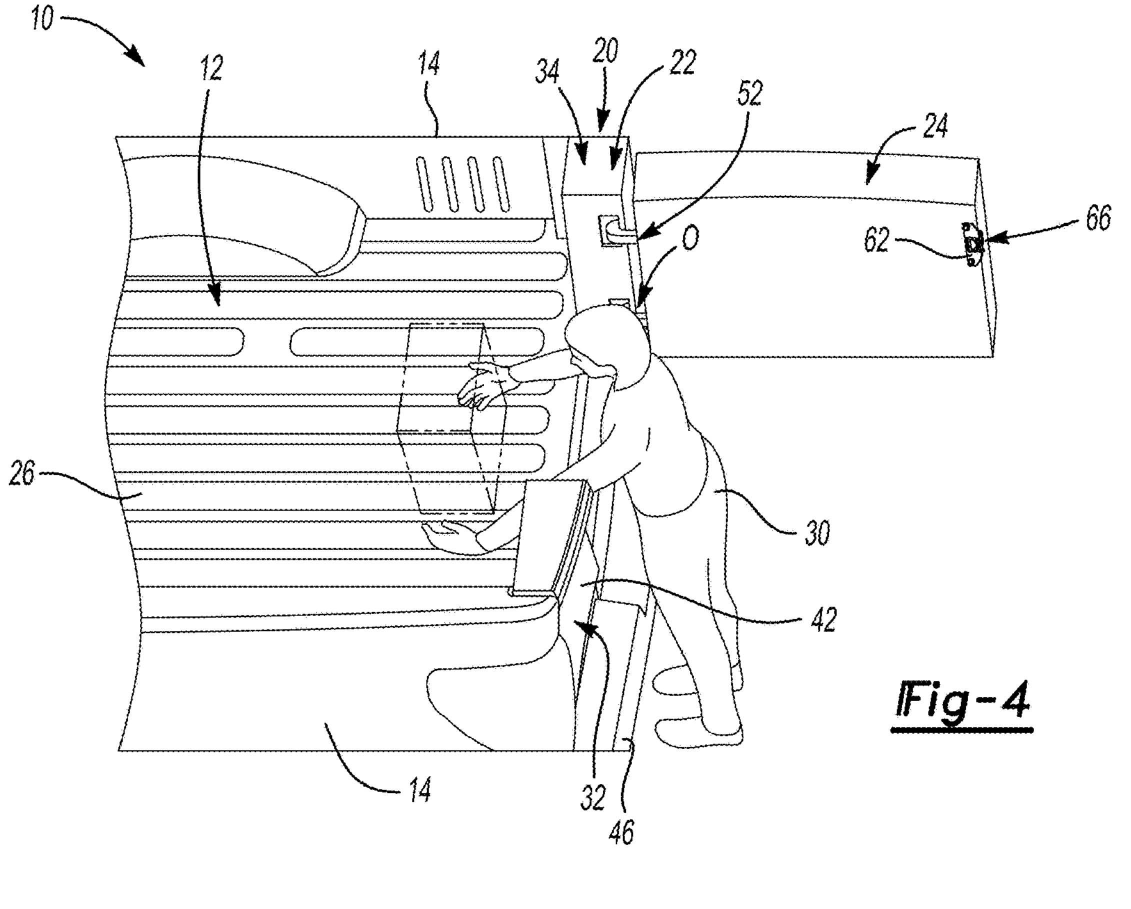
FIG. 4 shows a user loading an item into the cargo space when the tailgate assembly and the door subassembly are positioned as shown in FIG. 3.
Figure 5:
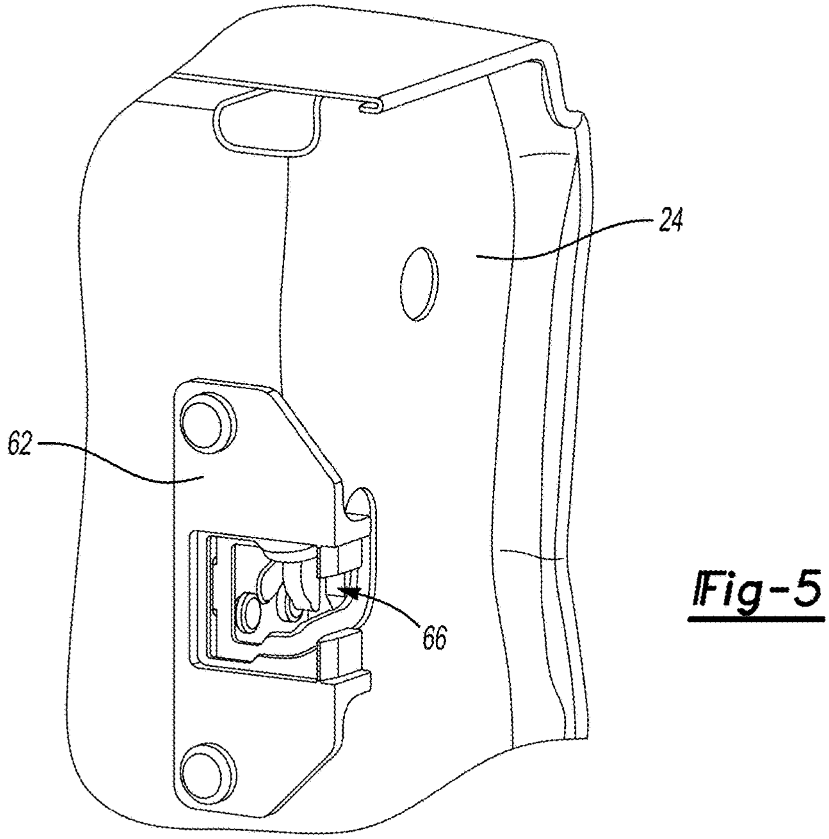
FIG. 5 a close-up view of an area of the door subassembly showing an anchor bracket of a latch system that is used to hold the door subassembly in a door closed position according to an exemplary embodiment of the present disclosure.
Figure 6:
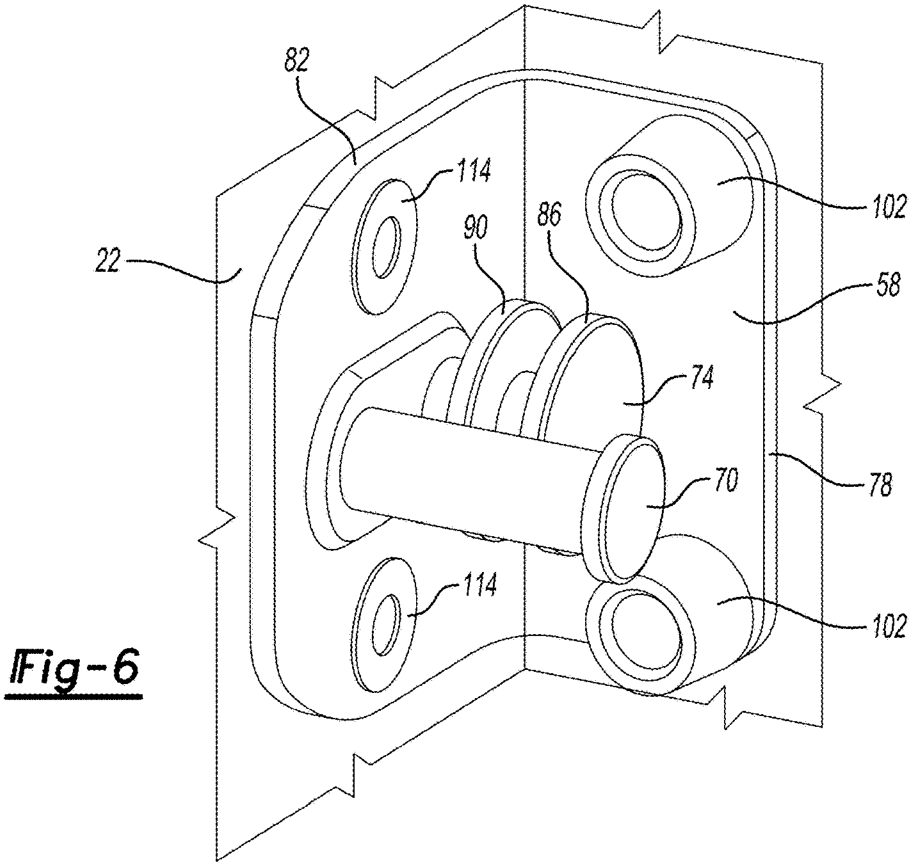
FIG. 6 is a close up view of an area of the frame subassembly showing a striker bracket of the latch system according to the exemplary embodiment.
Figure 7:
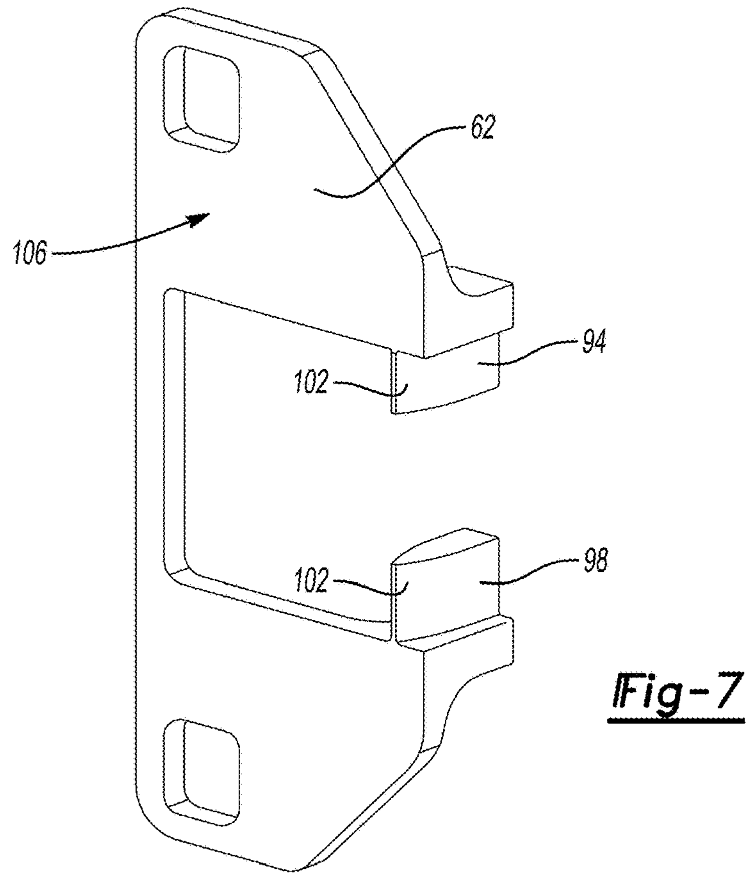
FIG. 7 illustrates a perspective view of the anchor bracket of FIG. 5.
Figure 8:
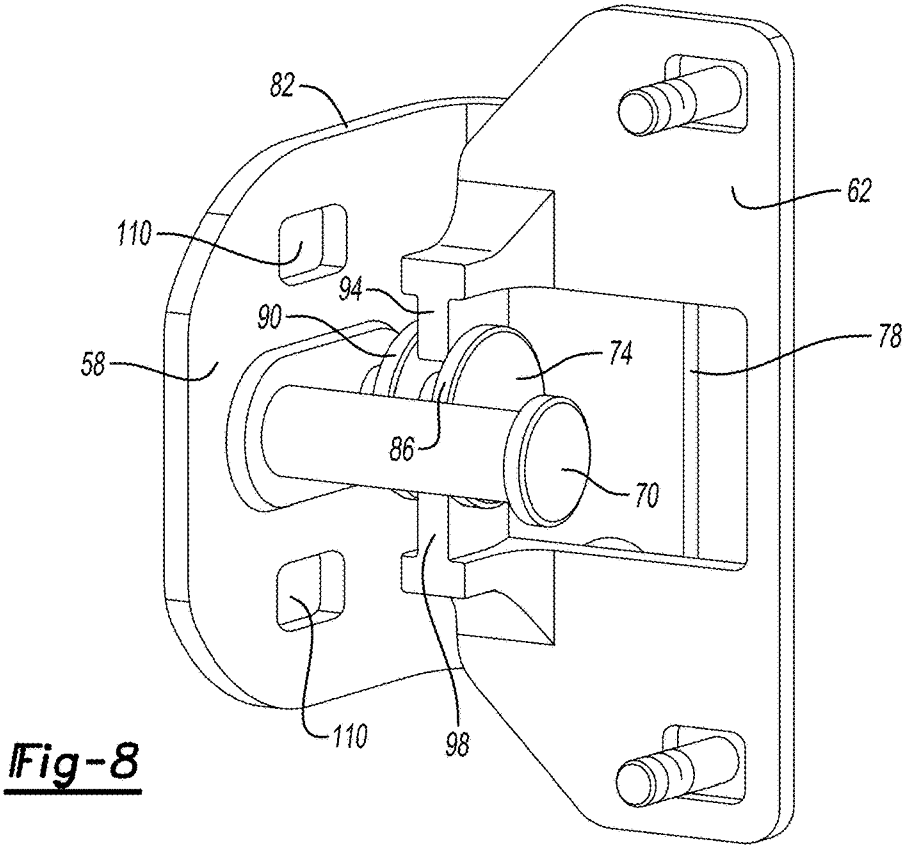
FIG. 8 illustrates a perspective view of the anchor bracket and the striker bracket of the latch system when the door subassembly is in the door closed position and with portions of the door subassembly and the frame subassembly removed to reveal the latch system.

As shown in FIG. 4, a user 30 can access the cargo bed 12 through the cargo bed access opening O provided when the door subassembly 24 in the door open position. Placing the door subassembly 24 in the door open position allows the user 30 to move closer to the cargo bed 12 than, for example, if the user 30 were loading an item into the cargo bed 12 when the tailgate assembly 20 is in the tailgate open position of FIG. 2. The cargo bed access opening O can also provide clearance for the user 30 to enter the cargo bed 12 to load or retrieve cargo.

The frame subassembly 22 includes, among other things, a first outboard section 32, a second outboard section 34, and a connection member 36. The first outboard section 32, the second outboard section 34, and the connection member 36 pivot together when the frame subassembly 22 is moved between the tailgate closed position and the tailgate open position. A portion of the connection member 36 can dip vertically downward to keep the connection member 36 below the floor 26 of the cargo bed 12.

When the door subassembly 24 is in the door open position, the first outboard section 32 is on a driver side of the cargo bed access opening O and the second outboard section 34 is on a passenger side of the cargo bed access opening O.

The first outboard section 32 includes an outer panel 42, and the second outboard section 34 includes an outer panel 44. When the tailgate assembly 20 is in the tailgate closed position of FIG. 1, the outer panels 42 and 44 can be viewed by an individual standing behind the vehicle 10. The connection member 36, however, is concealed from view behind a bumper 46 or a fascia for example.

The door subassembly 24 includes an outer panel 48 that is also visible to a user when the tailgate assembly 20 is in the tailgate closed position of FIG. 1. When the door subassembly 24 is in the door closed position, the outer panel 48 of the door subassembly 24 separates the outer panel 42 of the first outboard section 32 from all portions of the outer panel 44 of the second outboard section 34. When the door subassembly 24 is in the door open position, the cargo bed access opening O extends vertically downward at least as far as the vertically bottommost sides of the outer panel 42 of the first outboard section 32 and the outer panel 44 of the second outboard section 34.

The door subassembly 24 is pivotably coupled to the frame subassembly 22 through a hinge system that includes, in this example, two hinges 52. In this example, the door subassembly 24 is pivotably coupled to the second outboard section 34. In another example, the door subassembly 24 is pivotably coupled to the first outboard section 32.

The hinges 52 are gooseneck hinges in this example. The hinges 52 permit the door subassembly 24 to pivot relative to the frame subassembly 22, and to pivot well away from the cargo bed access opening O. The hinges 52 can include two door check positions, say at forty-five and ninety degrees. The door subassembly 24 can pivot one-hundred degrees when transitioned from the closed door position to a fully open door position.

With reference now to FIGS. 5-8 and continuing reference to FIGS. 1-4, the tailgate assembly 20 utilizes a latch system to hold the door subassembly 24 in the door closed position relative to the frame subassembly 22. The latch system includes features that can help to address looseness and alignment, particularly lateral alignment of the door subassembly 24 relative to the frame subassembly 22 when the door subassembly 24 is in the door closed position.

The latch system includes, in the exemplary embodiment, a striker bracket 58, an anchor bracket 62, and a latch 66. The striker bracket 58 is mounted to the frame subassembly 22. The anchor bracket 62 and the latch 66 are mounted to the door subassembly 24.

The example striker bracket 58 includes a striker post 70, an anchor post 74, a bumper flange 78, and a base 82. When the door subassembly 24 is in the door open position, the striker post 70, the anchor post 74, and the bumper flange 78 extend transversely from the base 82 into the cargo bed access opening O. As the door subassembly 24 is pivoted to the door closed position, the latch 66 moves over the striker post 70 and engages the striker post 70 to hold the door subassembly 24 in the door closed position.

The example latch system incorporates features that help to establish and maintain alignment of the door subassembly 24 relative to the frame subassembly 22 and other portions of the vehicle 10. In particular, the anchor post 74 is utilized to limit lateral movements of the door subassembly 24, and the bumper flange 78 is utilized to inhibit fore/aft movements of the door subassembly 24.

The anchor post 74, in the example embodiment, includes an inboard disk 86 and an outboard disk 90. The anchor bracket 62 includes, in the exemplary embodiment, an upper tooth 94 and a lower tooth 98.

When the door subassembly 24 is pivoted to the door closed position and the latch 66 engages the striker post 70, the upper tooth 94 and the lower tooth 98 move between the inboard disk 86 and the outboard disk 90, which are spaced a distance from each other. Contact between the upper tooth 94, the lower tooth 98, and the inboard disk 86 can help to limit movement of the door assembly 24 in a direction $T_1$ (FIG. 1) where the door subassembly 24 tilts relative to the frame subassembly 22. Contact between the upper tooth 94, the lower tooth 98, and the outboard disk 90 can help to inhibit tilting movement in an opposite direction $T_2$ where the door subassembly 24 tips closer to the frame subassembly 22. The positioning of the upper tooth 94 and the lower tooth 98 between the inboard disk 86 and the outboard disk 90 can thus help to maintain a desired gap G between the door subassembly 24 and the frame subassembly 22.

In this example, the upper tooth 94 and the lower tooth 98 include angled front faces 102 that help to guide the upper tooth 94 and the lower tooth 98 into a position between the inboard disk 86 and the outboard disk 90 as the door subassembly 24 pivots to the door closed position.

In this example, the upper tooth 94 and the lower tooth 98 move over the striker post 70 to fit between the inboard disk 86 and the outboard disk 90 of the anchor post 74. The striker post 70 is forward the anchor post 74 in the example embodiment.

The bumper flange 78 is forward both the striker post 70 and the anchor post 74. In the example embodiment, the latch system includes bumpers 102 that are mounted directly to the bumper flange 78. Forward and aft are with reference to an orientation of the vehicle 10.

When the door subassembly 24 is moved to the door closed position, a contact face 106 of the anchor bracket 62 contacts the bumpers 102 and compresses the bumpers 102. This contact eliminates open gaps between the contact face 106 and can help to prevent chuck and looseness of the door subassembly 24 relative to the frame subassembly 22 when the door subassembly 24 is in the door closed position.

The base 82 includes a plurality of apertures 110 that each receive a mechanical fastener 114 used to secure the striker bracket 58 to the frame subassembly 22. The apertures 110 can be oversized relative to the respective fastener 114.

During assembly, aligning of the door subassembly 24 and its latch system 50 and the associated latch system can include using the fasteners 114 to loosely secure the striker bracket 58 to the frame subassembly 22. The door subassembly 24 is then closed. As the apertures 110 are slightly oversized relative to the fasteners 114, the striker bracket 58 can shift as the striker post is engaged by the latch 66, and as the anchor post 74 is moved between the upper tooth 94 and the lower tooth 98.

The door subassembly 24 can then be pivoted away from the door closed position as the striker bracket 58 is held in position. An operator, for example, can then fully secure the fasteners 114 to secure the striker bracket 58 relative to the frame subassembly 52.

Because the bumper flange 78 is part of the striker bracket 58, the bumper flange 78 moves forward and aft when a position of the striker bracket 58 relative to the frame subassembly 22 is adjusted. This can help to control a size of the gap between the bumper flange 78 and the contact face 106. Controlling a size of this gap can ensure that the bumpers 102 are at least slightly compressed when the door subassembly 24 is in the door closed position.

Figure 9:
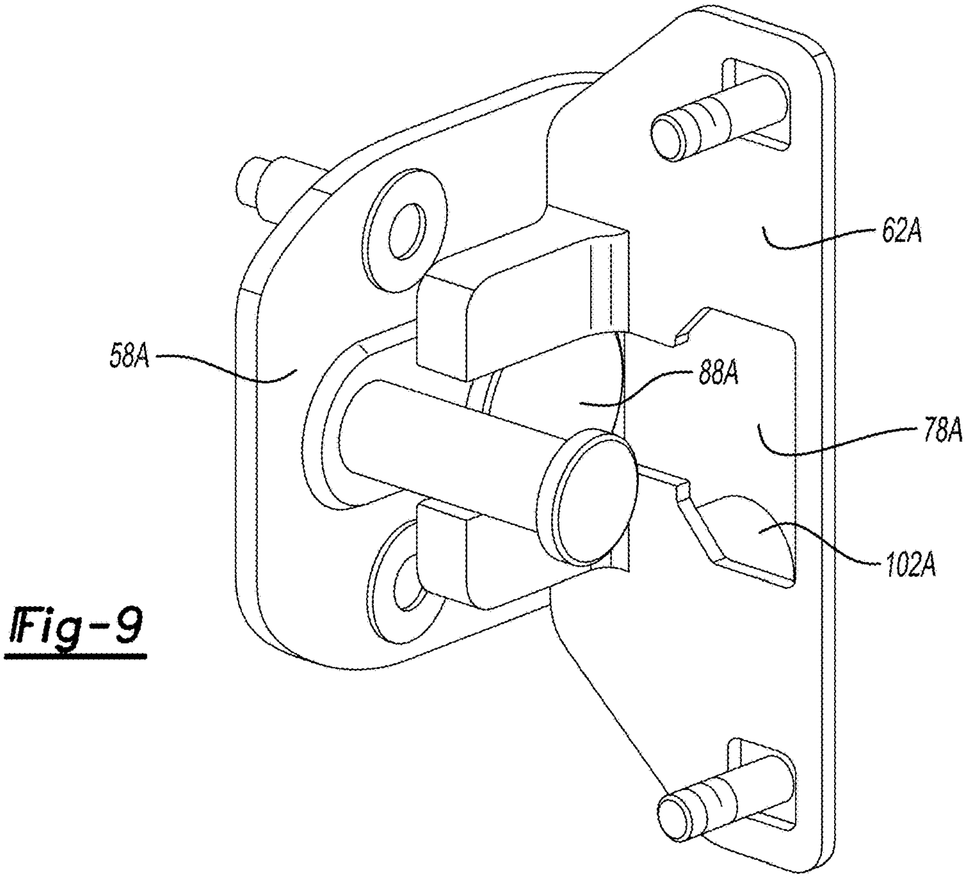
FIG. 9 illustrates a perspective view of a latch system according to another exemplary aspect of the present disclosure when a door subassembly is in the door closed position.
Figure 10:
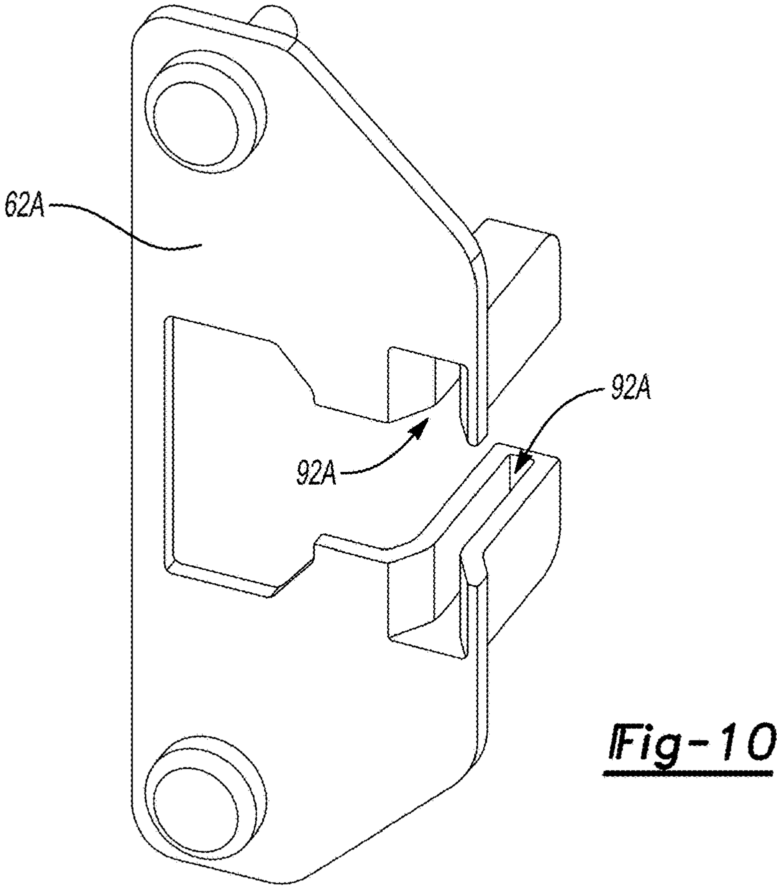
FIG. 10 illustrates a perspective view of an anchor bracket from the latch system of FIG. 9.
Figure 11:
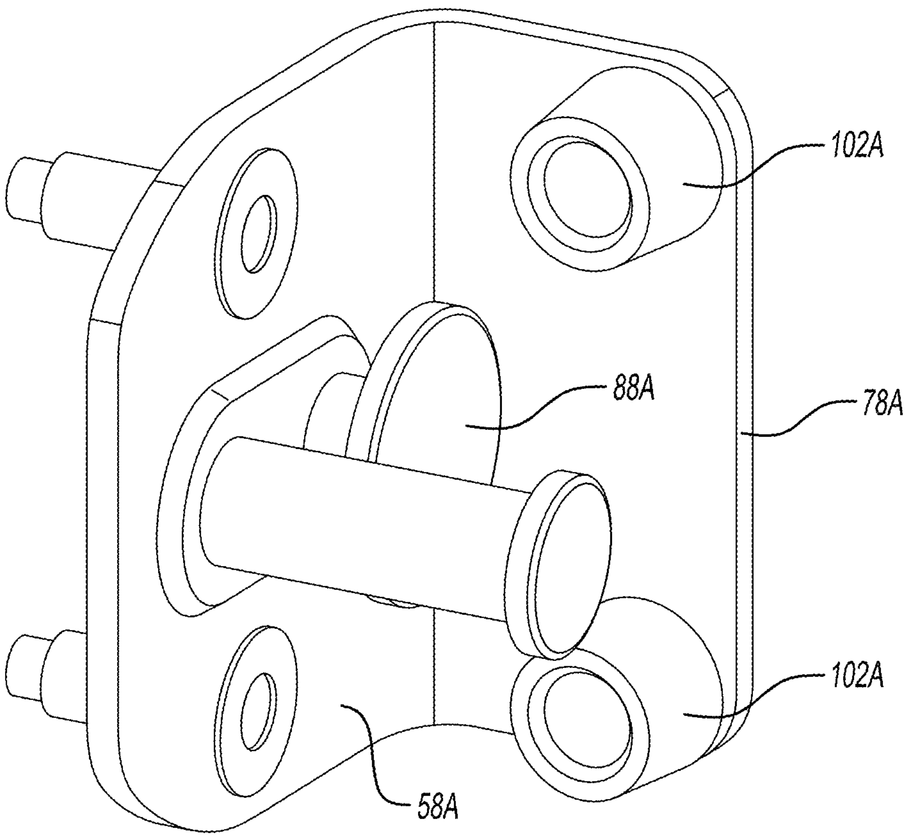
FIG. 11 illustrates a perspective view of a striker bracket from the latch system of FIG. 10.

With reference now to FIGS. 9-11, in another example embodiment, a latch system includes a disk 88A on a striker bracket 58A. The disk 88A is received within at least one recess 92A of an anchor bracket 62A when the associated door subassembly 24A is in a door closed position as shown in FIG. 9. Contact between the anchor brackets 62A and the disk 88A limits lateral movement of the door subassembly 24A relative to the frame subassembly 22A. The striker bracket 58A includes a bumper flange 78A. Bumpers 102A are secured to the striker bracket 58A and adjust with the remaining portions of the striker bracket 58A.

While the examples of this disclosure include the striker bracket 58 on the frame subassemblies 22 and 22A, other example embodiments could include incorporating striker brackets onto a door subassembly, and then an anchor bracket onto a frame subassembly.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:

a frame subassembly of a tailgate, the frame subassembly having a cargo bed access opening;

a door subassembly of the tailgate, the door subassembly pivotably coupled to the frame subassembly, the door subassembly pivotable relative to the frame subassembly back-and-forth between a door open position and a door closed position, the door subassembly in the door closed position closing the cargo bed access opening;

a latch system that holds the door subassembly in the door closed position, the latch system having a striker bracket that includes a striker post and a bumper flange configured to move together when the striker bracket is adjusted; and at least one bumper compressed against the bumper flange when the door subassembly is in the door closed position.

2. The vehicle assembly of claim 1, wherein the frame subassembly includes a first outboard section on a driver side of the cargo bed access opening of the cargo bed access opening, and a second outboard section on a passenger side of the cargo bed access opening.

3. The vehicle assembly of claim 1, wherein the striker bracket includes a base, the striker post and the bumper flange extending transversely from the base into the cargo bed access opening.

4. The vehicle assembly of claim 1, wherein the striker bracket is mounted to the frame subassembly.

5. The vehicle assembly of claim 1, wherein the striker bracket is adjustably mounted to the frame subassembly.

6. The vehicle assembly of claim 1, wherein the at least one bumper is mounted to the bumper flange.

7. The vehicle assembly of claim 1, wherein the striker bracket includes an inboard disk and an outboard disk spaced a distance from the inboard disk, and further comprising an anchor bracket having at least one tooth that projects into an area between the inboard disk and the outboard disk when the door subassembly is in the door closed position, the at least one tooth configured to contact the inboard disk to limit movement of the door subassembly away from the frame subassembly, the at least one tooth configured to contact the outboard disk to limit movement of the door subassembly toward the frame subassembly.

8. The vehicle assembly of claim 7, wherein the striker bracket includes an anchor post having the inboard disk and the outboard disk.

9. The vehicle assembly of claim 8, wherein the striker bracket is secured to the frame subassembly and the anchor bracket is secured to the door subassembly.

10. The vehicle assembly of claim 9, wherein the anchor post is disposed between the bumper flange and the striker post.

11. The vehicle assembly of claim 9, wherein the striker post is disposed forward the anchor post.

12. The vehicle assembly of claim 8, wherein the at least one tooth comprises an upper tooth and a lower tooth.

13. The vehicle assembly of claim 1, wherein the door subassembly and the frame subassembly are pivotable together about a first axis between a tailgate closed position and a tailgate open position, wherein the door subassembly is pivotable relative to the frame subassembly about a second axis between the door closed position and the door open position, the first axis transverse to the second axis.

14. The vehicle assembly of claim 1, wherein the frame subassembly and the door subassembly are pivotable together about a horizontally extending axis, wherein the door subassembly is configured to pivot relative to the frame subassembly about a vertically extending axis.

15. The vehicle assembly of claim 1, wherein the cargo bed access opening extends vertically downward at least as far as a floor of a cargo bed.

16. A tailgate assembly, comprising:

a frame subassembly having a cargo bed access opening;

a door subassembly pivotably coupled to the frame subassembly, the door subassembly and the frame subassembly pivotable together about a horizontally extending axis between a tailgate closed position and a tailgate open position, the door subassembly pivotable relative to the frame subassembly about a vertically extending axis between a door open position and a door closed position, the door subassembly in the door closed position closing the cargo bed access opening; and a latch system that holds the door subassembly in the door closed position, the latch system having a striker bracket mounted to the frame subassembly and an anchor bracket mounted to the door subassembly, the striker bracket including a striker post and an anchor post having an inboard disk and an outboard disk, the anchor bracket including having at least one tooth that is sandwiched between the inboard disk and the outboard disk when the door subassembly is in the door closed position.

17. The tailgate assembly of claim 16, further comprising a base and a bumper flange of the striker bracket, wherein the bumper flange, the striker post, and the anchor post extend transversely from the base into the cargo bed access opening, wherein the base is secured directly to the frame subassembly.

18. The tailgate assembly of claim 17, further comprising at least one bumper sandwiched between the bumper flange and the anchor bracket when the door subassembly is in the door closed position.

19. The tailgate assembly of claim 18, wherein the at least one bumper is mounted to the bumper flange.

* * * * *